US009690431B2

(12) United States Patent
Shahparnia et al.

(10) Patent No.: US 9,690,431 B2
(45) Date of Patent: Jun. 27, 2017

(54) LOCKING ACTIVE STYLUS AND TOUCH-SENSOR DEVICE

(75) Inventors: Shahrooz Shahparnia, Campbell, CA (US); Sherif Hanna, Foster City, CA (US)

(73) Assignee: Atmel Corporation, San Jose, CA (US)

( * ) Notice: Subject to any disclaimer, the term of this patent is extended or adjusted under 35 U.S.C. 154(b) by 416 days.

(21) Appl. No.: 13/328,055

(22) Filed: Dec. 16, 2011

(65) Prior Publication Data

US 2013/0106762 A1    May 2, 2013

Related U.S. Application Data

(60) Provisional application No. 61/553,114, filed on Oct. 28, 2011.

(51) Int. Cl.
*A61B 1/005* (2006.01)
*G06F 3/044* (2006.01)
*G06F 3/0354* (2013.01)
*G06F 3/038* (2013.01)

(52) U.S. Cl.
CPC ............ *G06F 3/044* (2013.01); *G06F 3/0383* (2013.01); *G06F 3/03545* (2013.01)

(58) Field of Classification Search
USPC .................................................. 345/174–178
See application file for complete search history.

(56) References Cited

U.S. PATENT DOCUMENTS

| 4,695,680 | A | 9/1987 | Kable | |
| 5,533,141 | A * | 7/1996 | Futatsugi et al. | ............. 382/119 |
| 5,581,269 | A * | 12/1996 | Butcher | .................. G06F 3/038 |
| | | | | 345/1.1 |
| 5,973,677 | A | 10/1999 | Gibbons | |
| 7,612,767 | B1 | 11/2009 | Griffin | |
| 7,663,607 | B2 | 2/2010 | Hotelling | |
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Amr Awad
*Assistant Examiner* — Andre Matthews
(74) *Attorney, Agent, or Firm* — Baker Botts L.L.P.

(57) ABSTRACT

In one embodiment, a system comprises a touch sensor and a stylus. The touch sensor comprises drive lines and sense lines arranged such that intersections of the drive lines and sense lines form capacitive nodes. The drive lines transmits a first signal having an identification portion. The stylus comprises a sense unit and a drive unit. The sense unit senses the first signal from the drive lines, compares the identification portion to criteria stored in the stylus, and authorizes the drive unit to transmit a second signal based on the first signal if the identification portion satisfies the criteria stored in the stylus. The drive unit transmits the second signal to the sense lines such that transmission of the second signal changes capacitance of the capacitive nodes.

19 Claims, 6 Drawing Sheets

(56) References Cited

U.S. PATENT DOCUMENTS

| | | |
|---|---|---|
| 8,040,326 B2 | 10/2011 | Hotelling |
| 8,049,732 B2 | 11/2011 | Hotelling |
| 8,179,381 B2 | 5/2012 | Frey |
| 2008/0238885 A1 | 10/2008 | Zachut |
| 2009/0095540 A1 | 4/2009 | Zachut |
| 2009/0115725 A1 | 5/2009 | Shemesh |
| 2009/0127005 A1 | 5/2009 | Zachut |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0155153 A1 | 6/2010 | Zachut |
| 2010/0292945 A1 | 11/2010 | Reynolds |
| 2010/0315384 A1 | 12/2010 | Hargreaves |
| 2011/0007029 A1 | 1/2011 | Ben-David |
| 2011/0314077 A1* | 12/2011 | Pala et al. ............. 709/202 |
| 2012/0013555 A1* | 1/2012 | Maeda et al. ............. 345/173 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |

OTHER PUBLICATIONS

U.S. Appl. No. 61/454,950, filed Mar. 21, 2011, Lynch.

U.S. Appl. No. 61/454,894, filed Mar. 21, 2011, Rothkopf.

Kyung, Ki-Uk et al., "wUbi-Pen : Windows Graphical User Interface Interacting with Haptic Feedback Stylus," *SIGGRAPH,*, Los Angeles, California, Aug. 2008.

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

* cited by examiner

LOCKING ACTIVE STYLUS AND TOUCH-SENSOR DEVICE

RELATED APPLICATION

This application claims the benefit, under 35 U.S.C. §119(e), of U.S. Provisional Patent Application No. 61/553114, filed 28 Oct. 2011, which is incorporated herein by reference.

TECHNICAL FIELD

This disclosure generally relates to touch-position sensors.

BACKGROUND

A touch-position sensor, or a touch sensor, may detect the presence and location of an object or the proximity of an object (such as a user's finger or a stylus) within a touch-sensitive area of the touch sensor overlaid, for example, on a display screen. In a touch sensitive display application, the touch position sensor may enable a user to interact directly with what is displayed on the screen, rather than indirectly with a mouse or touch pad. A touch sensor may be attached to or provided as a part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch-position sensors, such as, for example, resistive touch screens, surface acoustic wave touch screens, and capacitive touch screens. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
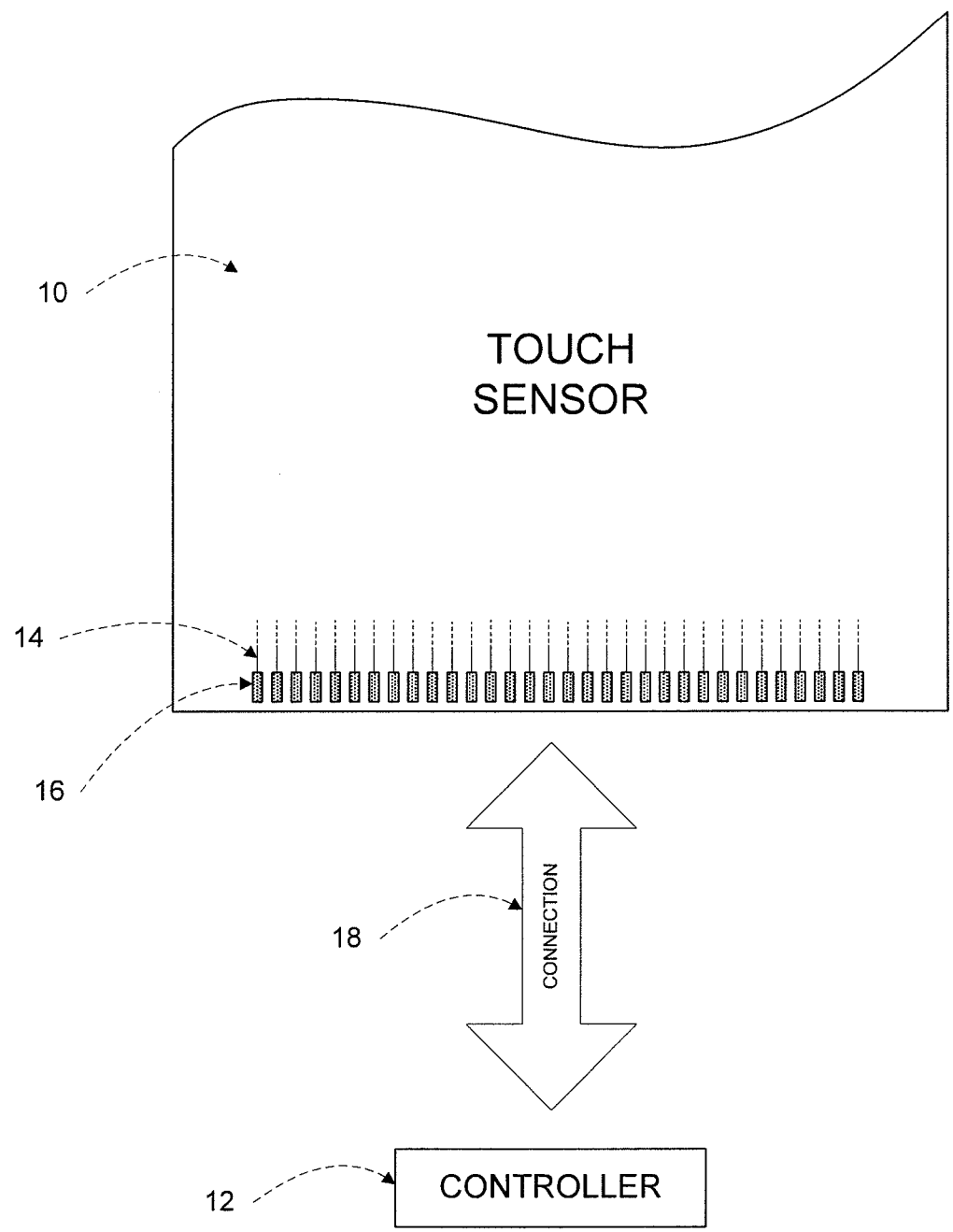
FIG. 1 illustrates an example touch sensor.

FIG. 1 illustrates an example touch sensor 10 with an example controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns (m) or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). In some embodiments, connection 18 may include conductive lines on the FPC coupling touch-sensor controller 12 to connection pads 16, in turn coupling touch-sensor controller 12 to tracks 14 and to the drive or sense electrodes of touch sensor 10. In other embodiments, connection pads 16 may be inserted into an electro-mechanical connector (such as a zero insertion force wire-to-board connector). In these embodiments, connection 18 may not need to include an FPC. This disclosure contemplates any suitable connection 18 between touch-sensor controller 12 and touch sensor 10.

Figure 2:
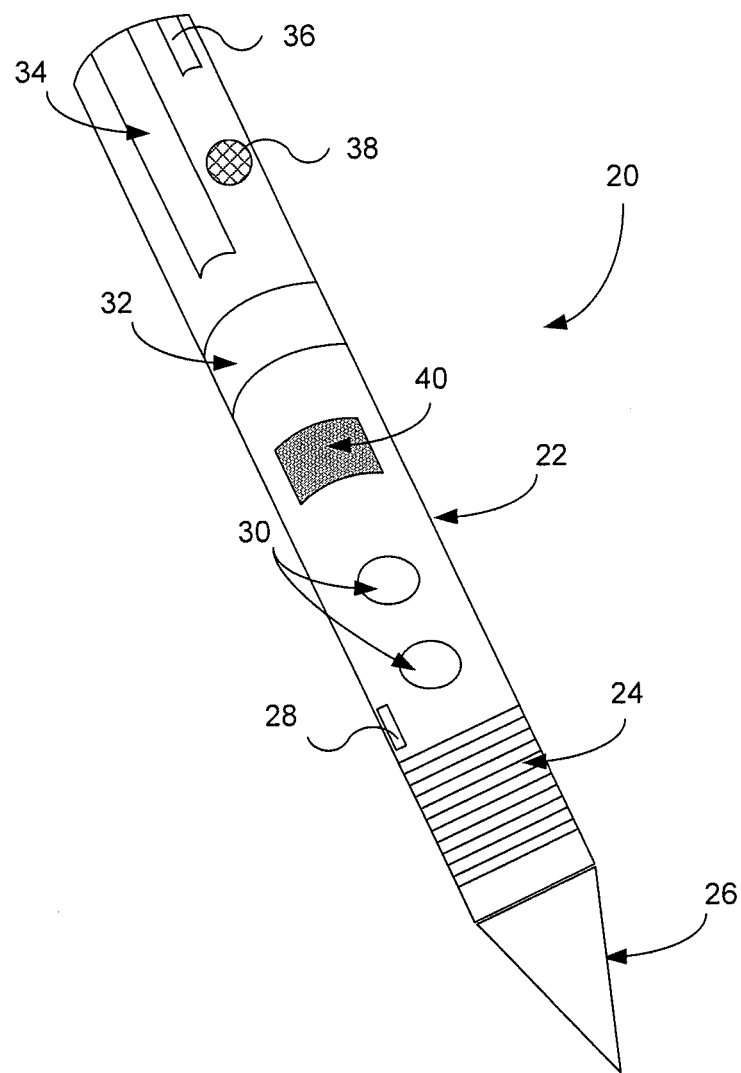
FIG. 2 illustrates an example active stylus exterior.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
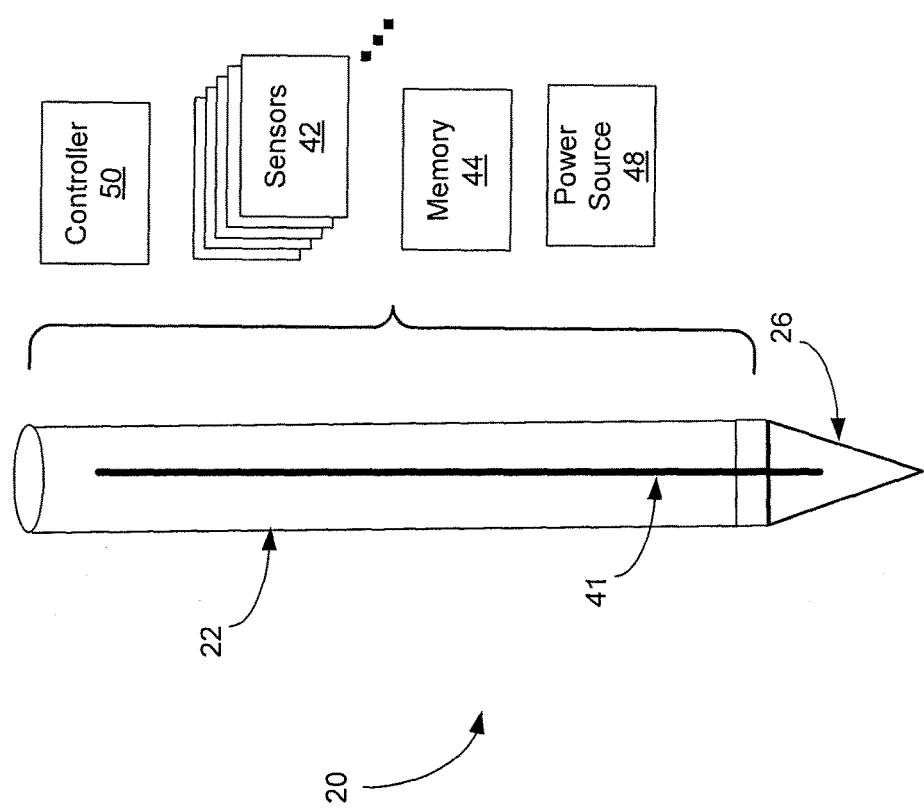
FIG. 3 illustrates an example active stylus interior.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
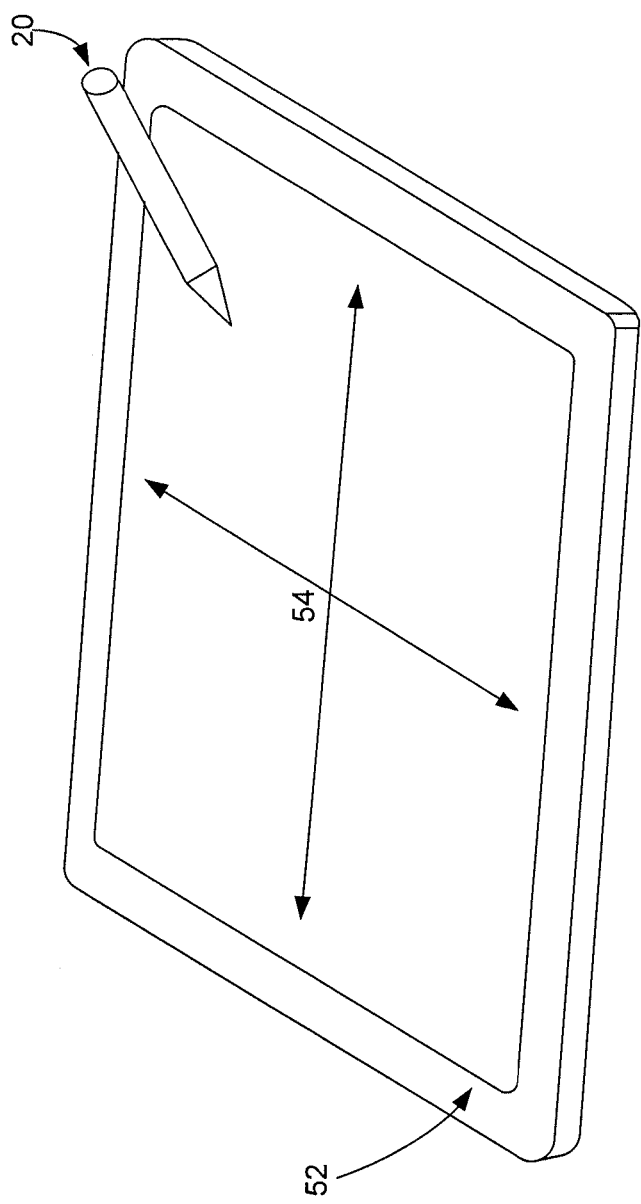
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
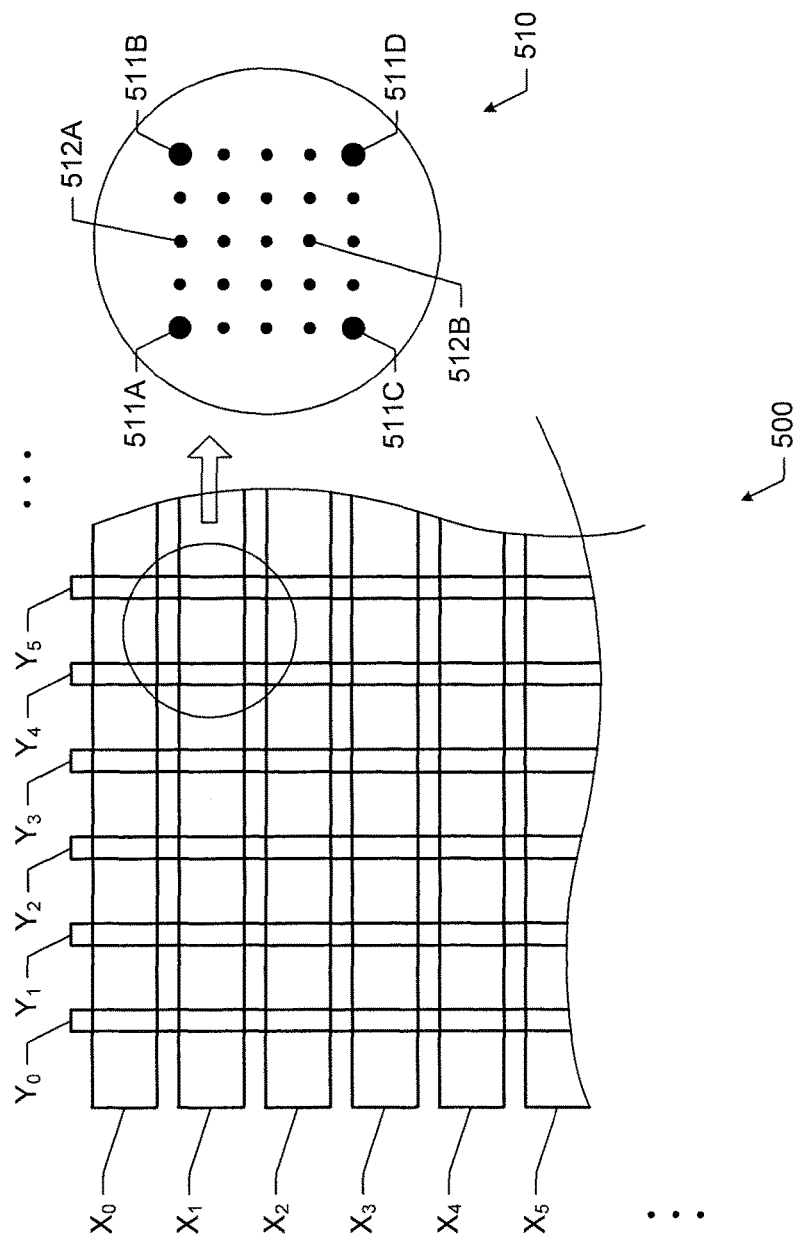
FIG. 5 illustrates an example array of electrodes.

As described above in connection with FIG. 1, in particular embodiments, a touch sensor (e.g., touch sensor 10 illustrated in FIG. 1) may include an array of drive and sense electrodes or an array of electrodes of a single type. These electrodes may be coupled to a controller (e.g., controller 12 illustrated in FIG. 1) by specific tracks (e.g., tracks 14 illustrated in FIG. 1). The drive unit of the controller may supply drive signals to the drive electrodes through some tracks, and the sense unit of the controller may sense charge at the capacitive nodes through other tracks. The electrodes may be arranged in various patterns and this disclosure contemplates any suitable patterns for the electrode arrangements. For example, FIG. 5 illustrates an example array of electrodes arranged in a X-Y grid pattern. In particular embodiments, the drive electrodes may be arranged along one set of lines (e.g., the X lines: $X_0$ to $X_{n-1}$) and the sense electrodes may be arranged along another set of lines (e.g., the Y lines: $Y_0$ to $Y_{n-1}$). The capacitive nodes are at one or more intersections of the X and Y lines. A touch-sensitive area 500 may be populated with these electrodes.

In particular embodiments, to determine the location of an object, such as a stylus or a user's finger, within a touch-sensitive area (e.g., touch-sensitive area 500), a scan of the electrodes or coordinates within the touch-sensitive area may be performed (e.g., driving the drive electrodes and scanning the capacitive nodes within touch-sensitive area 500). In some implementations, the drive electrodes are driven one line at a time. More specifically, a number of pulses (e.g., 3 or 4 pulses) is sent along each line of drive electrodes (e.g., each X line), and for each pulse, a number of signal samples (e.g., 1 or 2 samples) is read by scanning the corresponding capacitive nodes along that line. For example, in FIG. 5, the drive electrodes along the $X_0$ line may be driven first, and the corresponding capacitive nodes along the $X_0$ line may be scanned to take the signal samples. Then, the drive electrodes along the $X_1$ line are driven next, and the corresponding capacitive nodes along the $X_1$ line are scanned to take the signal samples. And so on, until the electrodes along the last line, $X_{n-1}$, are driven and the corresponding capacitive nodes along the $X_{n-1}$ line are scanned to take the signal samples. The samples may be digitally quantized (e.g., via an analog-to-digital converter (ADC)). The digital samples are then transmitted in individual frames. In particular embodiments, a frame includes a full scan of some or all the capacitive nodes within a touch-sensitive area. As an example, in the case illustrated in FIG. 5, a frame includes [M×N] samples, where N denotes the number of X lines (e.g., drive lines) and M denotes the number of pulses sent along each X line.

In the example grid of electrodes illustrated in FIG. 5, the capacitive nodes are at the intersections of the drive and scan electrodes. Using a small section 510 of touch-sensitive area 500 to simplify the discussion, section 510 includes 4 capacitive nodes 511A, 511B, 511C, 511D. When a stylus moves around touch-sensitive area 500, it may be at a coordinate coincide with one of the capacitive nodes or it may be at a coordinate in between a number of capacitive nodes. For example, coordinate 512A is mostly in between nodes 511A and 511B, whereas coordinate 512B is in between nodes 511A, 511B, 511C, and 511D. A touch-sensor device is often able to determine more distinct coordinates within its touch-sensitive area than the actual number of capacitive nodes included in the touch-sensitive area. This is because coordinates in between the capacitive nodes can also be detected.

In some implementations, the capacitive nodes are scanned to measure the signals (e.g., voltage levels) at these nodes. The signal for each coordinate is interpolated using the signals measured at the capacitive nodes near that coordinate. In some implementations, if a capacitive node is nearer a specific coordinate, then that capacitive node has more influence on the coordinate. Conversely, if a capacitive node is farther away from a specific coordinate, then that capacitive node has less influence on the coordinate.

In the example case illustrated in FIG. 5, for coordinate 512A, since it is located mainly in between capacitive nodes 511A and 511B, the signals from capacitive nodes 511A and 511B have more influence on coordinate 512A. Furthermore, since coordinate 512A is located approximately halfway in between capacitive nodes 511A and 511B, the signal influence of capacitive nodes 511A and 511B on coordinate 512A is about the same. Thus, the signal at coordinate 512A may be interpolated as 50% of the signal measured at capacitive nodes 511A plus 50% of the signal measured at capacitive nodes 511B. In addition, since capacitive nodes 511C and 511D are somewhat near coordinate 512A, their influence may also be taken into consideration when interpolating and calculating the signal at coordinate 512A (e.g., 45% of the signal measured at capacitive nodes 511A+45% of the signal measured at capacitive nodes 511B+5% of the signal measured at capacitive nodes 511C+5% of the signal measured at capacitive nodes 511D). Similarly, for coordinate 512B, its signal may be calculated by interpolating the signals measured at capacitive nodes 511A, 511B, 511C, and 511D since this coordinate is located in between these 4 capacitive nodes. Furthermore, since coordinate 512B is closer to capacitive nodes 511C and 511D than capacitive nodes 511A and 511B, capacitive nodes 511C and 511D have more influence on coordinate 512B than capacitive nodes 511A and 511B (e.g., 12.5% of the signal measured at capacitive nodes 511A+12.5% of the signal measured at capacitive nodes 511B+37.5% of the signal measured at capacitive nodes 511C+37.5% of the signal measured at capacitive nodes 511D).

Thus, when an object (such as a finger or active stylus 20) touches or comes within proximity of a capacitive node (such as capacitive nodes 511A, 511B, 511C, and 511D), a change in capacitance may occur at the capacitive node, and a touch-sensor controller (such as touch-sensor controller 12) may measure the change in capacitance. By measuring changes in capacitance throughout the array, the touch-sensor controller may determine the position of the touch or proximity within the touch-sensitive area(s).

In some embodiments, touch sensor 10 and active stylus 20 may operate in "touch" mode and/or "anti-touch" mode. Generally, when a human finger touches or comes within proximity of a capacitive node, the touch-sensor controller may measure a decrease in capacitance of the capacitive node. In particular embodiments, active stylus 20 may be configured to decrease capacitance of a capacitive node when active stylus 20 touches or comes within proximity of the capacitive node. This configuration of active stylus 20 may be referred to as "touch" mode because, in this configuration, active stylus 20 may resemble the "touch" of a human finger by decreasing capacitance of a capacitive node.

In particular embodiments, active stylus 20 may be configured to increase capacitance of a capacitive node when active stylus 20 touches or comes within proximity of the capacitive node. This configuration of active stylus 20 may be referred to as "anti-touch" mode because, in this configuration, active stylus 20 does not resemble the "touch" of a human finger. In some embodiments, active stylus 20 is equipped to operate in both touch and anti-touch modes. For example, in some embodiments, a user may choose between touch and anti-touch mode by inputting a selection through buttons 30 or sliders 32 or 34.

In some circumstances, a particular active stylus 20 or a category of active styluses 20 may be "locked" to a particular touch sensor 20 or a category of touch sensors 20. For example, a particular active stylus 20 may be configured to work only with a particular touch sensor 20 or to work better with a particular touch sensor 20 than with other touch sensors 20. As another example, a particular category of active styluses 20 may be configured to work only with a particular category of touch sensors 20 or to work better with a particular category of touch sensors 20 than with other touch sensors 20. Examples of categories may include product model (e.g., a category of touch sensors 20 may include all touch sensors 20 sharing the same model number), manufacturer (e.g., a category of touch sensors 20 may include all touch sensors 20 manufactured by the same company), and mode of operation (e.g., "touch" mode or "anti-touch" mode).

In some embodiments, active styluses 20 and touch sensors 10 engage in two-way communication. For example, a particular active stylus 20 or a category of active styluses 20 may be "locked" to a particular touch sensor 10 or a category of touch sensors 10 by configuring the styluses to engage in specific behavior detectable by the touch sensors and/or configuring the touch sensors to engage in specific behavior detectable by the styluses. One example of such specific behavior may include a handshake. A handshake is a process of negotiation that sets parameters of a communication channel between two entities before normal communication over the channel begins. Another example of such specific behavior may include amplitude modulation. For example, the drive lines of the touch sensor may transmit a signal that is modulated to include an identification pattern recognizable by the active stylus. As yet another example of such specific behavior, the active stylus and the touch sensor may each unique identification numbers that must be verified by the other device before communication may proceed. For example, the drive lines of the touch sensor may transmit an identification number of the touch sensor, and the active stylus may determine whether it is authorized to operate with the touch sensor.

Figure 6:
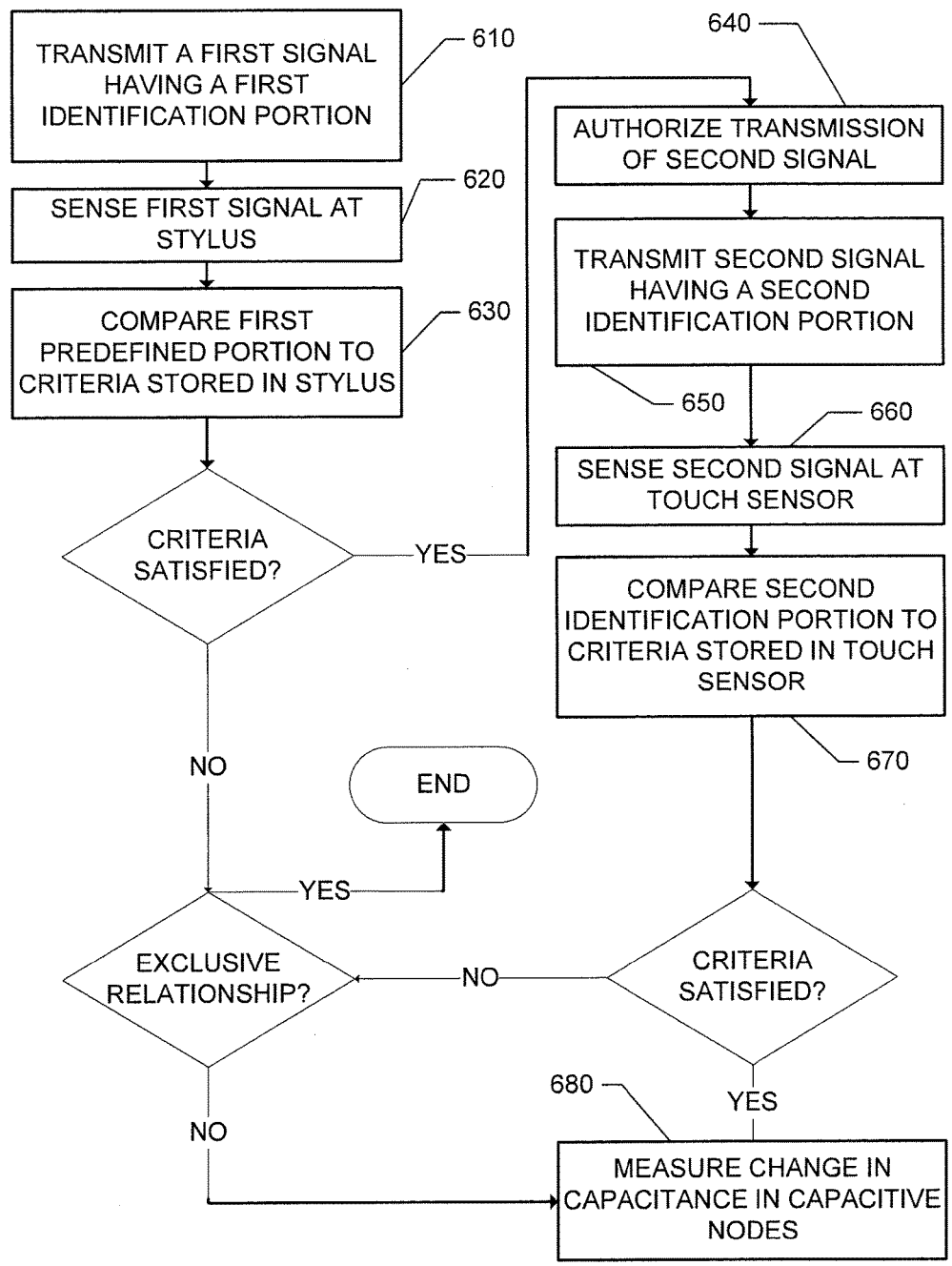
FIG. 6 illustrates an example method for locking communication between an active stylus and a touch-sensor device.

FIG. 6 illustrates an example method for locking communication between an active stylus and a touch-sensor device. The method starts at step 610, where the drive lines of a touch sensor (e.g., the X lines: $X_0$ to $X_{n-1}$ of touch sensor 10) transmit a first signal having a first identification portion. The first identification portion is a portion of the first signal that may be used to identify the sender of the signal (e.g., controller of touch sensor 10). For example, the first signal may be modulated to include a pattern unique to a particular touch controller or particular category of touch controllers. As another example, the first identification portion may communicate data, such as identification of a particular touch controller or particular category of touch controllers.

At step 620, the sense unit of controller 50 senses the signal transmitted by the drive lines of touch sensor 10. At step 630, controller 50 compares the first identification portion to criteria stored in stylus 20. For example, stylus 20 may be configured to operate with designated touch controllers or categories of touch controllers, and stylus 20 may compare the first identification portion to the criteria stored in stylus 20 to determine whether the controller of touch sensor 10 is one of the designated touch controllers.

If the first identification portion does not satisfy the criteria, the method skips steps 640-670. The first identification portion may not satisfy the criteria, for example, if the first identification portion does not match the criteria or the first identification portion is not detected in the first signal (e.g., the first signal is received from a device that does not transmit an identification portion).

If the first identification portion does satisfy the criteria, controller 50 authorizes the drive unit to transmit a second signal based on the first signal at step 640. In one example embodiment, the second signal is an amplified and/or modulated version of the first signal. At step 650, the drive unit transmits the second signal having a second identification portion. The second identification portion is a portion of the second signal that may be used to identify the sender of the signal (e.g., active stylus 20). For example, the second signal may be modulated to include a pattern unique to a particular stylus or particular category of styluses. As another example, the second identification portion may communicate data, such as identification of a particular stylus or particular category of styluses.

At step 660, the sense lines of the touch sensor (e.g., the Y lines: $Y_0$ to $Y_{n-1}$ of touch sensor 10) may sense the second signal from the drive unit of controller 50. Transmission of the signal and sensing by the touch sensor may cause a change in capacitance of one or more capacitive nodes of the touch sensor.

At step 670, touch sensor 10 compares the second identification portion to criteria stored in touch sensor 10. For example, touch sensor 10 may be configured to operate with designated styluses or categories of styluses, and touch sensor 10 may compare the second identification portion to the criteria stored in touch sensor 10 to determine whether active stylus 20 is one of the designated styluses.

If the second identification portion satisfies the criteria, the touch sensor controller 12 measures the change in capacitance in the one or more capacitive nodes at step 680. By measuring changes in capacitance throughout the array, touch-sensor controller 12 may determine the position of the touch or proximity within the touch-sensitive area(s). In this example, touch-sensor controller 12 may be configured with algorithms unique to active stylus 20. For example, active stylus 20 may be configured to transmit the second signal at a certain voltage or with a certain pattern, and touch-sensor controller 12 may have algorithms configured to the configuration of active stylus 20. As one example, active stylus may have a stylus tip 26 of a specific size, and the algorithms of touch-sensor controller 12 may calculate the position of the touch based in part on the size of stylus tip 26. For example, stylus tip 26 may be significantly smaller than a human finger such that stylus tip 26 can contact touch sensor 10 between capacitive nodes, whereas a human finger contacts touch sensor 10 across multiple capacitive nodes.

The second identification portion may not satisfy the criteria, however. The second identification portion may not satisfy the criteria, for example, if the second identification portion does not match the criteria or the second identification portion is not detected in the second signal (e.g., the second signal is received from a stylus that does not transmit an identification portion).

If the second identification portion does not satisfy the criteria, touch sensor 10 determines whether an exclusive relationship between touch sensor 10 and a stylus is required. For example, touch sensor 10 may be configured by the manufacturer to only operate with a specific stylus or category of styluses. In this example, if touch sensor 10 requires an exclusive relationship, then the second signal may be ignored, and the method may end.

If no exclusive relationship is required such that touch sensor 10 may operate with a variety of different devices (such as other styluses or human fingers), touch sensor controller 12 may still attempt to measure the change in capacitance in the one or more capacitive nodes even if the criteria stored in touch sensor 10 is not satisfied. This attempt to measure the change in capacitance may not result in accurate calculation of the position of the touch. For example, if touch sensor 10 is only configured to receive "anti-touch" inputs indicated by an increase in capacitance, and touch sensor controller 12 measures a decrease in capacitance at step 680, then touch sensor controller 12 may ignore the decrease in capacitance, and the method may end. In another example, touch-sensor controller 12 may be configured with algorithms unique to a specific active stylus 20, and inputs received from devices other than the specific active stylus 20 may result in inaccurate measurements. In this manner, other devices than the specific active stylus 20 may still function with touch sensor 10 but not as well as the specific active stylus 20.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In the example method of FIG. 6, the first and second signals each contained an identification pattern. In some embodiments, identification information may change over time. For example, in one embodiment, identification information is generated from an algorithm that produces a unique piece of identification information each time such information is generated. In this example, the recipient may be equipped with an algorithm for decoding the unique piece of identification information to determine the identification and/or credentials of the sender. In another example embodiment, the sender changes identification information periodically (e.g., every session or every hour). In this example embodiment, the recipient may be able to detect changes in identification information and determine the identity of the sender from the changed identification information.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, reference to a computer-readable non-transitory storage medium encompasses a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a combination of two or more of these, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
a drive unit of a stylus;
a sense unit of the stylus, the sense unit operable to:
sense a first signal from a first drive line of one or more drive lines of a touch sensor, the first signal modulated to include an identification portion comprising a pattern unique to the touch sensor or a category of touch sensors of which the touch sensor is a member, the identification portion of the first signal useable to identify a sender of the first signal;
compare the identification portion with one or more criteria stored in a memory device of the stylus; and
authorize the drive unit of the stylus to transmit a second signal to the touch sensor based on the first signal if the identification portion satisfies the criteria, wherein the second signal comprises one or more of an amplified version of the first signal and a modulated version of the first signal; and
the drive unit of the stylus operable to transmit the second signal to the touch sensor if authorized by the sense unit, transmission of the second signal changing a capacitance at one or more capacitive nodes of the touch sensor.

2. The system of claim 1, wherein:
the stylus is partially permitted to transmit signals prior to comparing the identification portion to the criteria stored in the stylus; and
comparing the identification portion to the criteria stored in the stylus further comprises allowing the stylus to transmit signals not previously permitted if the identification portion satisfies the criteria stored in the stylus.

3. The system of claim 1, wherein:
the stylus is not permitted to transmit signals prior to comparing the identification portion to the criteria stored in the stylus; and
comparing the identification portion to the criteria stored in the stylus further comprises allowing the stylus to transmit signals if the identification portion satisfies the criteria stored in the stylus.

4. The system of claim 1, the identification portion identifying the touch sensor to the sense unit, the drive unit further operable to select the second signal based on the identification.

5. The system of claim 4, wherein identifying the touch sensor to the sense unit comprises identifying, using the pattern unique to the touch sensor, a unique identification of the touch sensor to the sense unit, the sense unit further operable to compare the identification portion to the criteria stored in the stylus by comparing the unique identification of the stylus to the criteria stored in the stylus.

6. The system of claim 4, wherein identifying the touch sensor to the sense unit comprises identifying, using the pattern unique to the category of touch sensors of which the touch sensor is a member, the category of touch sensors of which the touch sensor is a member, the sense unit further operable to compare the identification portion to the criteria stored in the stylus by comparing the category to the criteria stored in the stylus.

7. The system of claim 1, wherein the second signal has a second identification portion, the identification portion of the second signal useable to identify a sender of the second signal.

8. The system of claim 7, the second identification portion providing a unique identification of the stylus to the touch sensor.

9. The system of claim 7, the second identification portion identifying a category of styluses of which the stylus is a member.

10. A non-transitory computer-readable storage medium storing instructions that are operable when executed by a processor to cause the processor to perform operations comprising:
sensing, from one or more drive lines of a touch sensor, a first signal at a stylus, the first signal modulated to include a first identification portion comprising a pattern unique to the touch sensor or a category of touch sensors of which the touch sensor is a member, the first identification portion useable to identify a sender of the first signal;
comparing the first identification portion with one or more criteria stored in a memory device of the stylus;
authorizing a drive unit of the stylus to transmit a second signal to the touch sensor based on the first signal if the identification portion satisfies the criteria, wherein the second signal comprises one or more of an amplified version of the first signal and a modulated version of the first signal; and
transmitting, to one or more sense lines of the touch sensor, the second signal from the stylus in response to the authorization, the second signal having a second identification portion useable to identify a sender of the second signal, the one or more sense lines forming one or more capacitive nodes with the one or more drive lines of the touch sensor.

11. The non-transitory computer-readable medium of claim 10, wherein the second identification portion of the second signal provides a unique identification of the stylus to the touch sensor.

12. The non-transitory computer-readable medium of claim 10, wherein the second identification portion of the second signal identifies a category of styluses of which the stylus is a member.

13. The non-transitory computer-readable medium of claim 10, wherein the stylus comprises a sense unit and a drive unit, and wherein:
the acts of sensing the first signal from the one or more drive and comparing the first identification portion to the one or more criteria stored in the stylus are performed by the sense unit; and
the act of transmitting the second signal to the one or more sense lines is performed by the drive unit.

14. The non-transitory computer-readable medium of claim 13, wherein:
the stylus is partially permitted to transmit signals prior to comparing the first identification portion to the criteria stored in the stylus; and
comparing the first identification portion with the one or more criteria stored in the memory device of the stylus further comprises allowing the stylus to transmit signals not previously permitted if the first identification portion satisfies the criteria stored in the stylus.

15. The non-transitory computer-readable medium of claim 13, wherein:
the stylus is not permitted to transmit signals prior to comparing the first identification portion to the criteria stored in the stylus; and
comparing the first identification portion with the one or more criteria stored in the memory device of the stylus further comprises allowing the stylus to transmit signals if the first identification portion satisfies the criteria stored in the stylus.

16. The non-transitory computer-readable medium of claim 13, the first identification portion identifying the touch sensor to the sense unit, and wherein the logic is further operable when executed by the one or more processors to perform the act of selecting the second signal based on the identification.

17. The non-transitory computer-readable medium of claim 16, wherein:
identifying the touch sensor to the sense unit comprises identifying, using the pattern unique to the touch sensor, a unique identification of the touch sensor to the sense unit; and
comparing the first identification portion to the criteria stored in the stylus comprises comparing the unique identification of the touch sensor to the criteria stored in the stylus.

18. The non-transitory computer-readable medium of claim 16, wherein:
identifying the touch sensor to the sense unit comprises identifying, using the pattern unique to the category of touch sensors of which the touch sensor is a member, the category of touch sensors of which the touch sensor is a member; and
comparing the first identification portion to the criteria stored in the stylus comprises comparing the category to the criteria stored in the stylus.

19. A method, comprising:
sensing, by a stylus, from one or more drive lines of a touch sensor, a first signal at a stylus, the first signal modulated to include a first identification portion comprising a pattern unique to the touch sensor or a category of touch sensors of which the touch sensor is a member, the first identification portion useable to identify a sender of the first signal;
comparing, by the stylus, the first identification portion with one or more criteria stored in a memory device of the stylus;
authorizing, by the stylus, a drive unit of the stylus to transmit a second signal to the touch sensor based on the first signal if the identification portion satisfies the criteria, wherein the second signal comprises one or more of an amplified version of the first signal and a modulated version of the first signal; and
transmitting, by the stylus, to one or more sense lines of the touch sensor, the second signal from the stylus in response to the authorization, the second signal having a second identification portion useable to identify a sender of the second signal, the one or more sense lines forming one or more capacitive nodes with the one or more drive lines of the touch sensor.

* * * * *